Sept. 14, 1937.　　　H. S. POWELL　　　2,093,210
CLAMPING DEVICE
Filed June 17, 1936
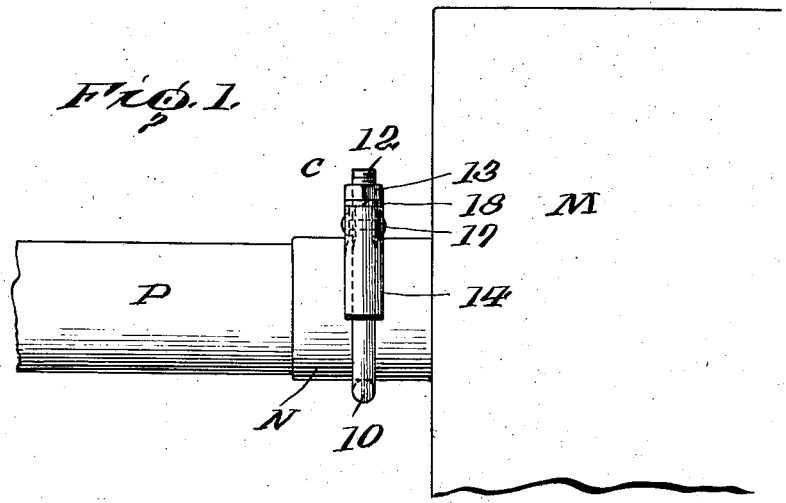
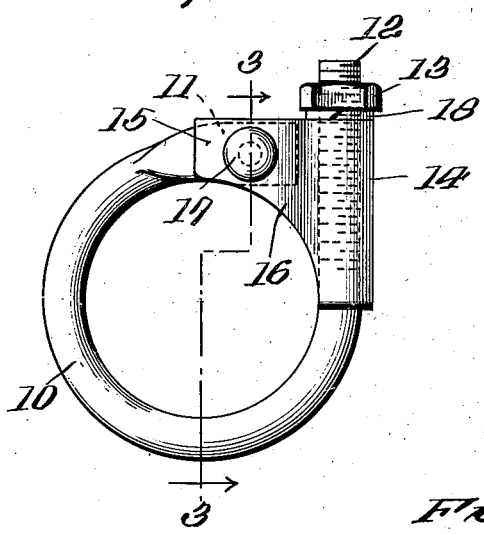
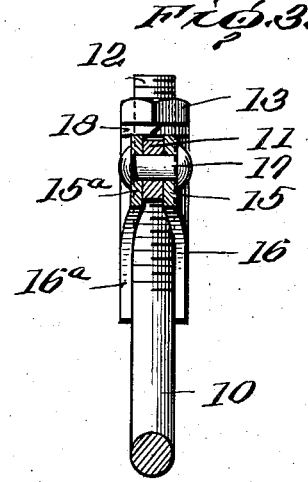
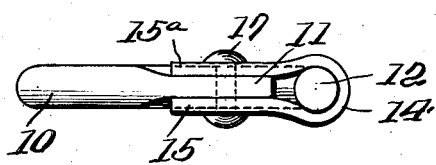
Inventor
Herbert S. Powell
By Mason & Porter
Attorneys Patented Sept. 14, 1937

2,093,210

UNITED STATES PATENT OFFICE 2,093,210

CLAMPING DEVICE

Herbert S. Powell, Utica, N. Y.

Application June 17, 1936, Serial No. 85,807

2 Claims. (Cl. 24—19)

The present invention relates to new and useful improvements in a device for clamping tubular conduits and more particularly to a device for clamping the projecting nipples of a muffler for internal combustion engines to the exhaust and tail pipes.

An object of the invention is to provide a clamping device which is inexpensive to manufacture, simple in construction, and readily applicable to the parts which are to be clamped together.

The above and other objects of the invention will in part be obvious and will be hereinafter more fully set forth.

In the drawing:

Fig. 1 is a fragmentary side elevation showing the clamping device in position to clamp the muffler nipple to the exhaust or tail pipe.

Fig. 2 is a plan view showing the details of the clamping device.

Fig. 3 is a sectional view of the clamping device, taken along the line 3—3 of Fig. 2.

Fig. 4 is a top view of Fig. 2.

Referring more in detail to the accompanying drawing, and particularly to Fig. 1, the exhaust or tail pipe P is shown extending into the projecting nipple N of a muffler M. The tail pipe and projecting nipple are of the usual metallic construction. The clamping device C is shown in position around the nipple N to clamp the same to the exhaust or tail pipe P.

The details of the clamping device will now be described, reference being had to Figs. 2, 3 and 4 of the drawing. The clamping device includes a substantially rigid ring member 10 which is of circular cross section and which may be formed of relatively heavy metal stock. One end of the ring member 10 is flattened out so as to provide a reduced flat portion 11. The opposite end 12 of the ring member 10 extends beyond the reduced end 11 and is substantially tangential to the curved portion of the ring member. This straight end 12 is threaded for the reception of a nut 13.

A clamping or tension bracket 14 is formed of sheet metal and is folded upon itself so that the portions 15, 15a thereof are disposed on opposite sides of the reduced end 11 of the ring member 10. The inner edges 16, 16a of the folded portions 15, 15a respectively are shaped symmetrically with respect to the curved portion of the ring member 10 so as to provide a substantial continuation of the inner edge of the ring member. The reduced end 11 of the ring member 10 and the portions 15, 15a of the bracket 14 are provided with aligned openings through which a rivet 17 extends, thus providing a connection between the ring member 10 and the bracket 14. The closed edge of the bracket 14 forms a channel, the axis of which is substantially tangential to the curvature of the curved portion of the ring member 10 so that the straight end portion 12 of the ring member can project therethrough. A lock washer 18 is placed over the projecting end of the portion 12 of the ring member and the nut 13 is then threaded thereon.

As illustrated in Fig. 1 of the drawing, the clamping device C is placed over the nipple N on the muffler and the exhaust or tail pipe is inserted within the nipple. The internal periphery of the entire clamping device is substantially circular so as to conform to the outer periphery of the nipple N. The nut 13 is now tightened so as to draw the ring member 10 tightly against the external surface of the nipple N and at the same time effect a tight engagement between the curved edges 16, 16a of the bracket 14 and the nipple N. This tightening of the nut 13 will cause a slight bending of the ring member 10 so as to reduce its internal diameter and effect the clamping action.

From the foregoing description, it will be readily seen that an efficient clamping device is hereby afforded, and one which is simple, strong and durable in construction. It is to be understood, of course, that the clamping device may be used for clamping together various tubular conduits.

It is to be clearly understood that minor changes in the details of construction and arrangement of parts may be made without departing from the scope of the invention as set forth in the appended claims.

I claim:

1. A clamping device comprising a clamping ring having a portion thereof shaped to conform to the curvature of a conduit to be clamped, said clamping ring having a flat end of relatively small thickness and having the opposite end thereof extending beyond the flat end and threaded, a clamping bracket for connecting the ends of said ring, said bracket having a pair of side portions disposed one on each side of the said flat end of said ring and having the closed portion thereof substantially encircling the threaded end of said ring, means connecting the side portions of said bracket to the flat end of said ring, and nut means engaging the threaded end of said ring and bearing against the edge of the closed portion of said bracket for tightening the clamping device.

2. A clamping device comprising a clamping ring having a portion thereof shaped to conform to the curvature of a conduit to be clamped, said clamping ring having a flat end of relatively small thickness and having the opposite end thereof extending beyond the flat end and threaded, a clamping bracket for connecting the ends of said ring, said bracket having a pair of side portions disposed one on each side of the said flat end of said ring and having the closed portion thereof substantially encircling the threaded end of said ring, the side portions of said bracket and the flat end of said ring having aligned openings therethrough, a rivet extending through said openings for connecting the flat end of said ring to the side portions of said bracket, and nut means engaging the threaded end of said ring and bearing against the edge of the closed portion of said bracket for tightening the clamping device.

HERBERT S. POWELL.